(12) United States Patent
Egarter

(10) Patent No.: US 11,034,394 B2
(45) Date of Patent: Jun. 15, 2021

(54) SYSTEM FOR IMPROVING THE AERODYNAMICS OF A LAND VEHICLE

(71) Applicant: EGHI SRL, Sexten (IT)

(72) Inventor: Christoph Egarter, Sexten (IT)

(73) Assignee: EGHI SRL, Sexten (IT)

( * ) Notice: Subject to any disclaimer, the term of this patent is extended or adjusted under 35 U.S.C. 154(b) by 104 days.

(21) Appl. No.: 16/495,665

(22) PCT Filed: Mar. 16, 2018

(86) PCT No.: PCT/EP2018/056659
§ 371 (c)(1),
(2) Date: Sep. 19, 2019

(87) PCT Pub. No.: WO2018/172207
PCT Pub. Date: Sep. 27, 2018

(65) Prior Publication Data
US 2020/0023910 A1    Jan. 23, 2020

(30) Foreign Application Priority Data

Mar. 22, 2017  (IT) ........................ 102017000031554

(51) Int. Cl.
*B62D 35/00*  (2006.01)
*B60R 13/10*  (2006.01)
(Continued)

(52) U.S. Cl.
CPC .......... *B62D 35/001* (2013.01); *B60R 13/105* (2013.01); *B60R 19/48* (2013.01); *B62D 35/008* (2013.01); *B62D 35/02* (2013.01)

(58) Field of Classification Search
CPC .... B62D 35/001; B62D 13/105; B62D 19/48; B62D 35/008; B62D 35/02
See application file for complete search history.

(56) References Cited

U.S. PATENT DOCUMENTS 4,262,953 A * 4/1981 McErlane ............ B62D 35/001
                                                   296/180.4
4,640,541 A * 2/1987 FitzGerald ........... B62D 35/001
                                                   280/851
(Continued)

FOREIGN PATENT DOCUMENTS

DE  10 2012 010 002 A1   11/2013
EP      1 870 322 A1     12/2007

OTHER PUBLICATIONS

International Search Report, dated Jun. 14, 2018 (2 pages).

*Primary Examiner* — Lori L Lyjak
(74) *Attorney, Agent, or Firm* — Jacobson Holman PLLC

(57) ABSTRACT

The invention relates to a system for a land vehicle (100), in particular for a truck or a truck trailer. The system is attached to the lower surface of the vehicle so as to lie opposite the roadway surface at the rear portion of the truck and comprises at least one part which is inclined in the longitudinal direction and extends rearwards in a tapering manner towards the rear part of the vehicle (100). At least one element (2, 12, 22) is arranged between the roadway surface and the inclined wall (3) substantially at the end of the inclined wall (3) after the last axle of the vehicle, wherein the horizontal axis of the at least one element (2, 12, 22) has substantially the same inclination as the inclined wall (3).

10 Claims, 9 Drawing Sheets

(51) Int. Cl.
  *B60R 19/48*   (2006.01)
  *B62D 35/02*   (2006.01)

(56) References Cited

U.S. PATENT DOCUMENTS

| | | | | |
|---|---|---|---|---|
| 5,280,990 | A * | 1/1994 | Rinard | B62D 35/001 |
| | | | | 296/180.1 |
| 6,837,536 | B1 * | 1/2005 | Schwartz | B62D 35/02 |
| | | | | 296/180.4 |
| 7,578,541 | B2 * | 8/2009 | Layfield | B62D 35/001 |
| | | | | 296/180.2 |
| 7,748,772 | B2 * | 7/2010 | Boivin | B60R 13/0861 |
| | | | | 296/180.4 |
| 7,780,224 | B2 * | 8/2010 | Roush | B62D 35/001 |
| | | | | 296/180.4 |
| 8,276,972 | B2 | 10/2012 | Domo et al. | |
| D746,178 | S * | 12/2015 | Guetersloh | D12/106 |
| 9,283,998 | B2 * | 3/2016 | Kibler | B62D 35/001 |
| 9,440,689 | B1 * | 9/2016 | Smith | B62D 35/02 |
| 9,567,016 | B2 * | 2/2017 | Magee | B62D 35/02 |
| 9,919,749 | B2 * | 3/2018 | Baker | B62D 35/001 |
| 10,435,083 | B2 * | 10/2019 | Wiegel | B62D 53/068 |
| 2005/0146161 | A1 * | 7/2005 | Uland | B62D 35/02 |
| | | | | 296/180.1 |
| 2008/0093887 | A1 * | 4/2008 | Wood | B62D 35/001 |
| | | | | 296/180.4 |
| 2008/0238139 | A1 * | 10/2008 | Cardolle | B62D 35/001 |
| | | | | 296/180.4 |
| 2008/0309122 | A1 | 12/2008 | Smith et al. | |
| 2010/0066123 | A1 * | 3/2010 | Ortega | B62D 35/001 |
| | | | | 296/180.4 |
| 2014/0110968 | A1 | 4/2014 | Hendersom | |

* cited by examiner

SYSTEM FOR IMPROVING THE AERODYNAMICS OF A LAND VEHICLE

BACKGROUND OF THE INVENTION

The present invention relates to a system for improving the aerodynamics of a land vehicle, in particular a truck or the like. Aerodynamic characteristics are the most relevant characteristics for fuel consumption. Especially vehicles that travel many miles, the slightest optimization of aerodynamics may lead to important benefits. Fuel savings are reflected in reduced costs. Also, reduced fuel consumption results in a reduced pollution, which may lead to tax benefits.

As used herein, the term surface, wall surface or wall is intended to designate the face, board and/or panel that forms a surface.

A multitude of systems are known for improving the air flow and hence the aerodynamic characteristics.

U.S. Pat. No. 8,276,972 discloses a system with deflectors placed before the rear wheels of the truck/trailer under the vehicle. The pressure of the air flow on the wheels is decreased and the air flow is directed toward the road surface. Drag vortices, i.e air turbulence behind the vehicle, are little or not affected.

Nevertheless, one drawback is the reduction of ground clearance, which involves a risk of damage due to stones or the like.

US 2008/0309122 A discloses a structure located at the end of the vehicle. This structure has a tapered shape, which reduces the air resistance encountered by the vehicle.

The position at the end of the vehicle causes the structure of the vehicle to have a greater length, which involves problems in loading or unloading operations.

DE 10 2012 010 002 discloses a wind-guiding apparatus for commercial vehicles with an air guiding system adapted to reduce air resistance, having at least one air deflecting member on the back. The latter is in the form of a diffuser.

DE 10 2012 010 002 discloses the provision of a rear lower guard member, which is composed of two horizontal and two vertical elements. This rear lower guard member must have a minimized blocking/hindering action on the air flow and has the only purpose of ensuring the safety of the rear lower guard, without blocking or affecting the air flow.

EP 1 870 322 discloses a system for improved the air flow of a land vehicle. The element described therein, located on the lower end side of the truck, is in the form of a diffuser. A lower guard is carried at the back toward the surface. This rear guard also has a vertical end surface. The element as disclosed in this publication, located on the lower rear part of the truck, also has the purpose of minimizing air flow disturbance.

US 2014/110968 A1 also discloses a system that should be adapted to regulate the air flow.

The deflectors as disclosed therein are located before the rear wheels of the trailer, to decrease stagnation pressure. Nevertheless, the drag vortices on the rear are little or not affected.

Air turbulence at the end of a land vehicle, namely a truck, are very important for the overall aerodynamic behavior of the vehicle.

Such air turbulence that forms drag vortices is especially caused by the size of the base surface, that is the rear side of the truck.

SUMMARY OF THE INVENTION

The object of the present invention is to provide a system for land vehicles, namely trucks or the like which improves aerodynamics, in particular the air flow/drag vortices at the end of the truck or the like, without adding elements that may act as obstacles during daily operation of the vehicle and handling thereof.

This object is fulfilled by a system of the invention for land vehicles, namely trucks and truck trailers, which is placed on the bottom surface of the vehicle facing the road surface on the rear end portion of the truck, comprising at least one longitudinally-inclined wall which tapers toward the back of the vehicle.

According to the invention substantially at the end of the inclined wall, after the last axle of the vehicle, an element is disposed between the road surface and the inclined wall, with the horizontal axis of the substantially having the same inclination as the inclined surface.

By this arrangement, the air flow is deflected backwards with a surprising effect and drag vortices are reduced due to a synergistic effect generated by the inclined surface and the element.

The combined effect of the inclined wall that forms an angle of inclination with the road surface advantageously ranging from 10° to 30°, more advantageously from 15° to 17° and the inclined element, whose horizontal axis has substantially the same inclination as the inclined surface, improves the aerodynamic characteristics of a land vehicle.

The inclined element may be used for license-plate attachment.

Furthermore, the inclined element may be formed with a wing shape. This will enhance the synergistic effect between the wall surface and the element.

In a further embodiment multiple parallel second inclined walls may be provided.

In one embodiment, the first inclined wall extends only over part of the width of the vehicle.

Advantageously, the first inclined wall extends from the rear axle of the truck toward the rear end of the truck.

The hollow body formed between the first inclined portion and the surface and the load-carrying floor of the truck may be used for storage of tools, spare wheels and the like.

DESCRIPTION OF THE DRAWINGS

Further characteristics and details of a preferred non-limiting embodiment of the invention as set forth herein will be clearly explained in the following description with reference to the accompanying figures, in which.

DETAILED DESCRIPTION OF THE INVENTION

Figure 1:
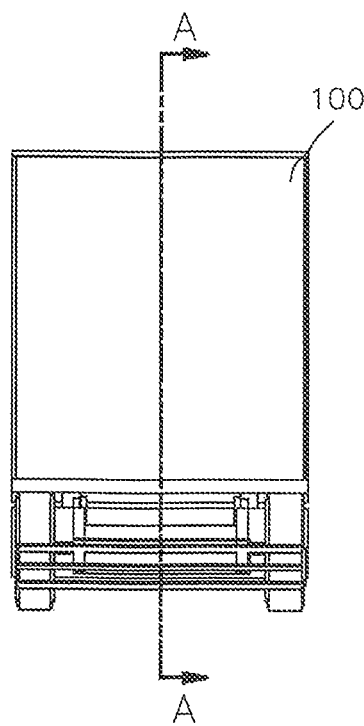
FIG. 1 shows a rear view of truck comprising a system of the invention according to a first embodiment.
Figure 2:
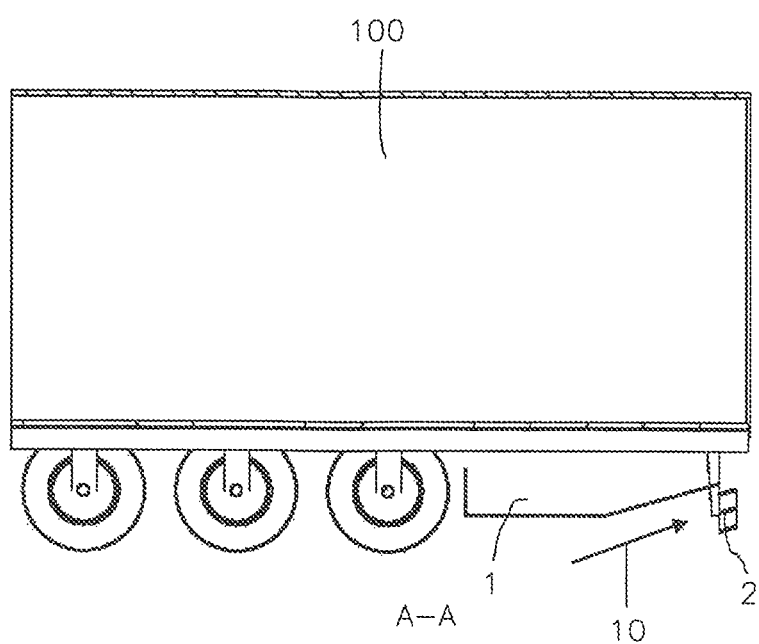
FIG. 2 shows a cross-section of FIG. 1.
Figure 3:
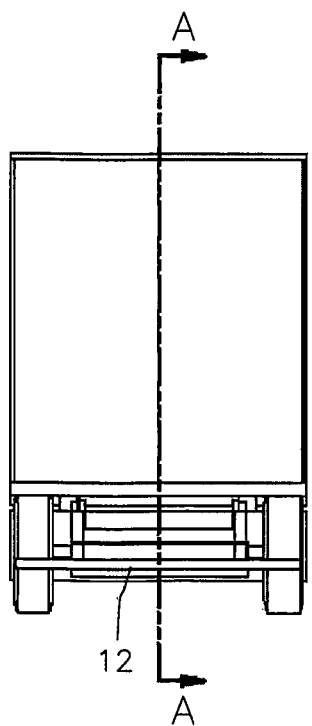
FIG. 3 shows a rear view of truck comprising a system of the invention according to a second embodiment.

In FIG. 1, numeral 100 designates a land vehicle comprising a system 1 of the invention.

Figure 4:
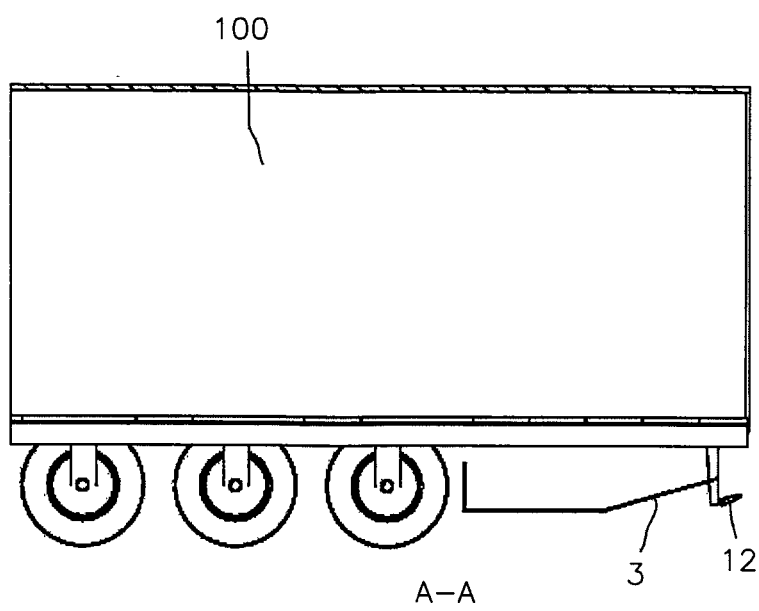
FIG. 4 shows a cross-section of FIG. 3.
Figure 5:
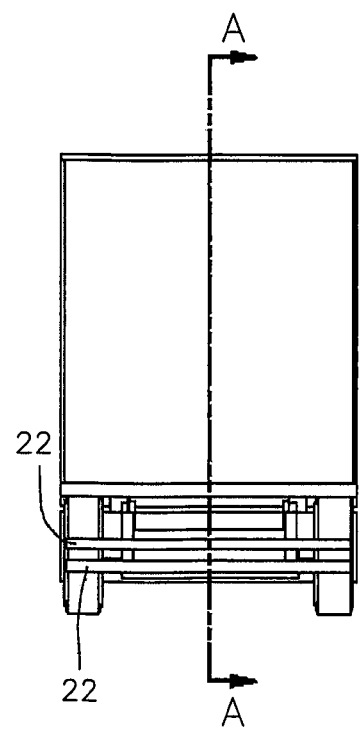
FIG. 5 shows a rear view of truck comprising a system of the invention according to a third embodiment.
Figure 6:
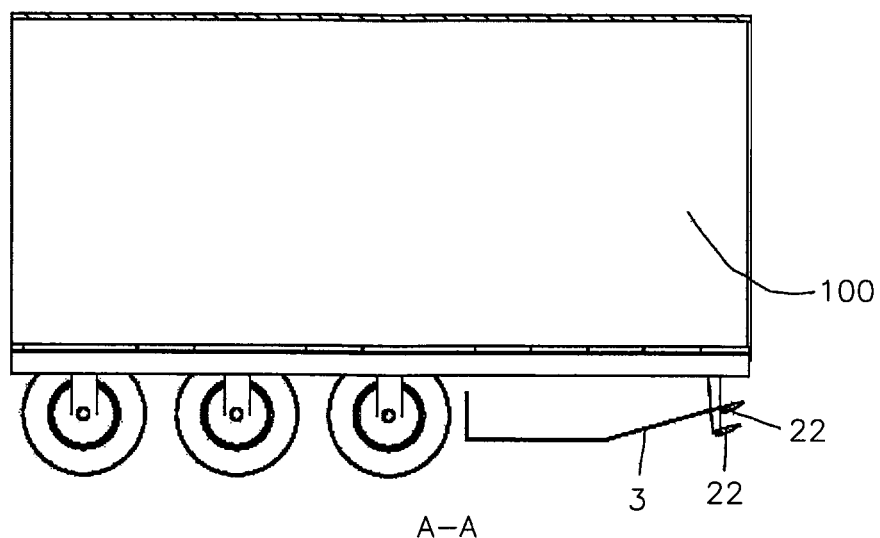
FIG. 6 shows a cross-section of FIG. 5.

As used herein the term land vehicle is intended to particularly designate a truck, a truck trailer or the like. In FIG. 4, numeral 3 designates a first wall that is advantageously located between the last rear axle of a land vehicle and the rear end of the vehicle 100. This first wall 3 faces the road surface, is inclined to the road surface and tapers toward the rear end of the land vehicle. Substantially toward the rear end of the vehicle at least one element 2, 12, 22 is disposed between the first inclined portion and the road surface, the horizontal axis of the element 2, 12, 22 being substantially parallel to the wall 3. The elements 2,12,22 are connected to the frame of the land vehicle 100, for example via tubular profiles 20.

The air flow 10 moves past the inclined wall 3. Thus, the air flow 10 is directed at the base surface behind the truck. The base surface of a vehicle 100 is the rearmost straight surface vertical to the direction of travel, which causes wake vortices. With the element 2,12,22 the air flow 10 is more efficiently deflected upwards, so that wake vortices therein will be modified, and the negative pressure created by the base surface is reduced by this air flow 10.

The element 2,12,22 may be formed in a variety of shapes, such as a flat wall, or a wing element 12 or as multiple elements, possibly identical, in overlapping relationship.

In a further embodiment, a license plate and/or a lighting fixture may be attached to the rear side of the element on the rear side of the land vehicle The elements 2,12,22 may be also formed in view of better absorbing shocks.

Figure 7:
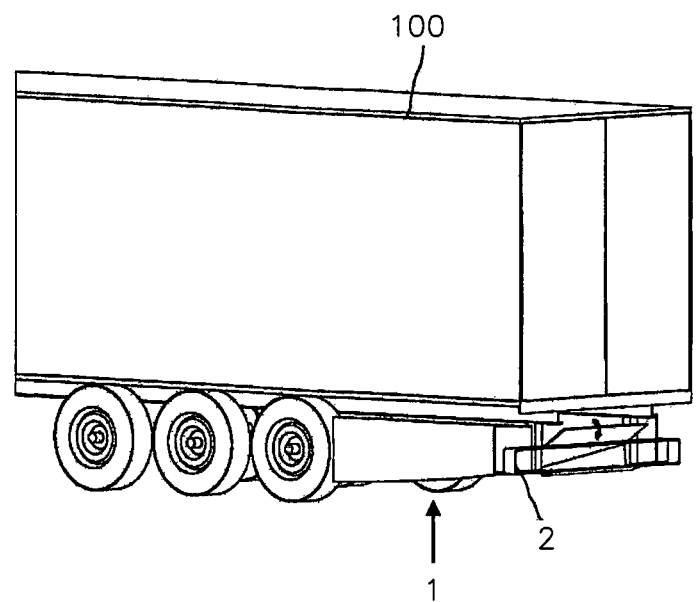
FIG. 7 shows a rear perspective view from behind a system of the invention.

In a further embodiment, the first inclined wall 3 forms the bottom surface of a hollow body and this loading space may be used for spare wheels, equipment, etc. This hollow body may be occupied at the rear as shown in FIG. 7 or laterally or both.

Figure 8:
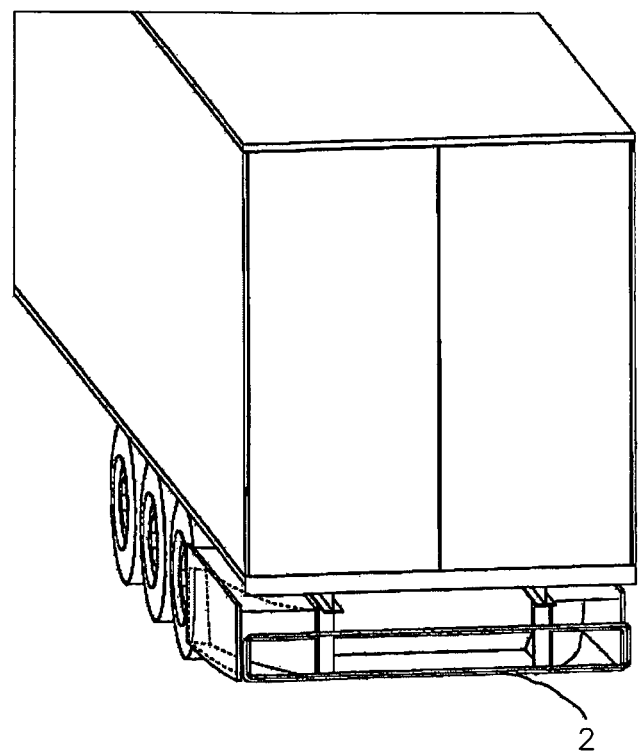
FIG. 8 shows a perspective view of a further embodiment of the invention.
Figure 9:
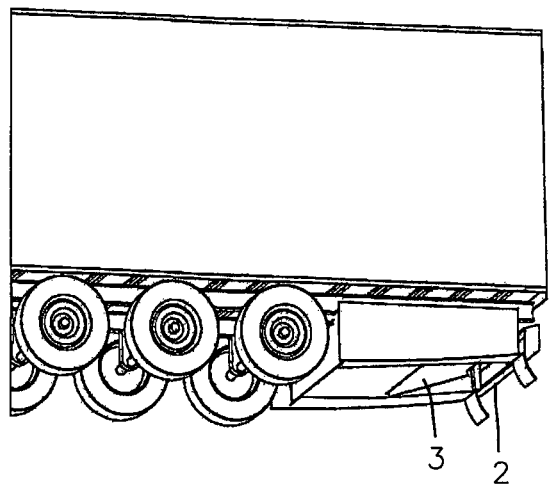
FIG. 9 shows a bottom perspective view of a further embodiment of the invention.

In order to improve the air flow, lateral body elements may be also provided, as shown in FIG. 8. They may be formed as an air escape to vent the wheel housing area.

Figure 10:
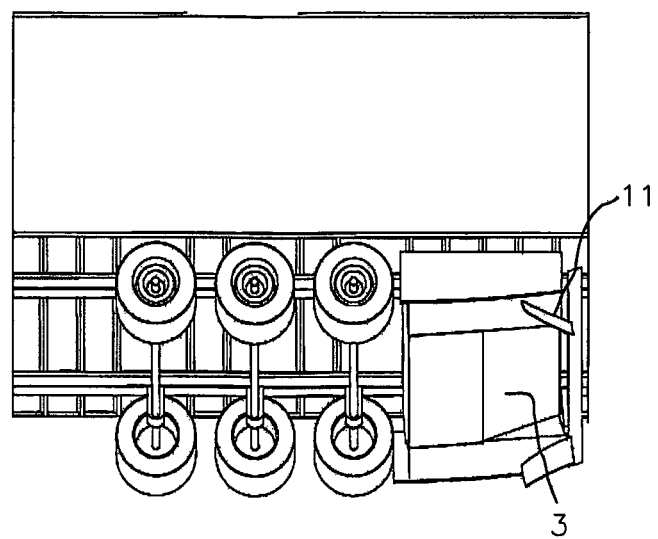
FIG. 10 shows a bottom perspective view of a further embodiment of the invention.

In a further embodiment, in FIG. 10, defector 11 in FIG. 10 designates an additional construction element. This construction defector 11 has the purpose of trapping dirt and may simultaneously deflect the air flow toward the element 2,12,22.

Figure 11:
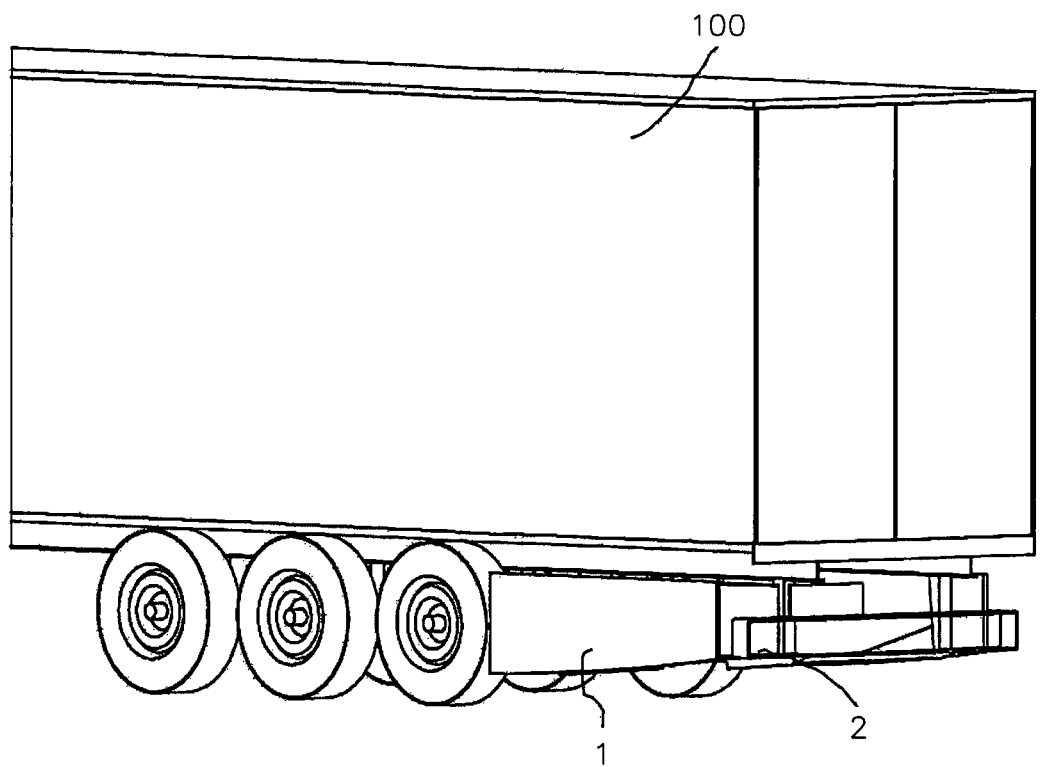
FIG. 11 shows a perspective view of a further embodiment of the invention.
Figure 12:
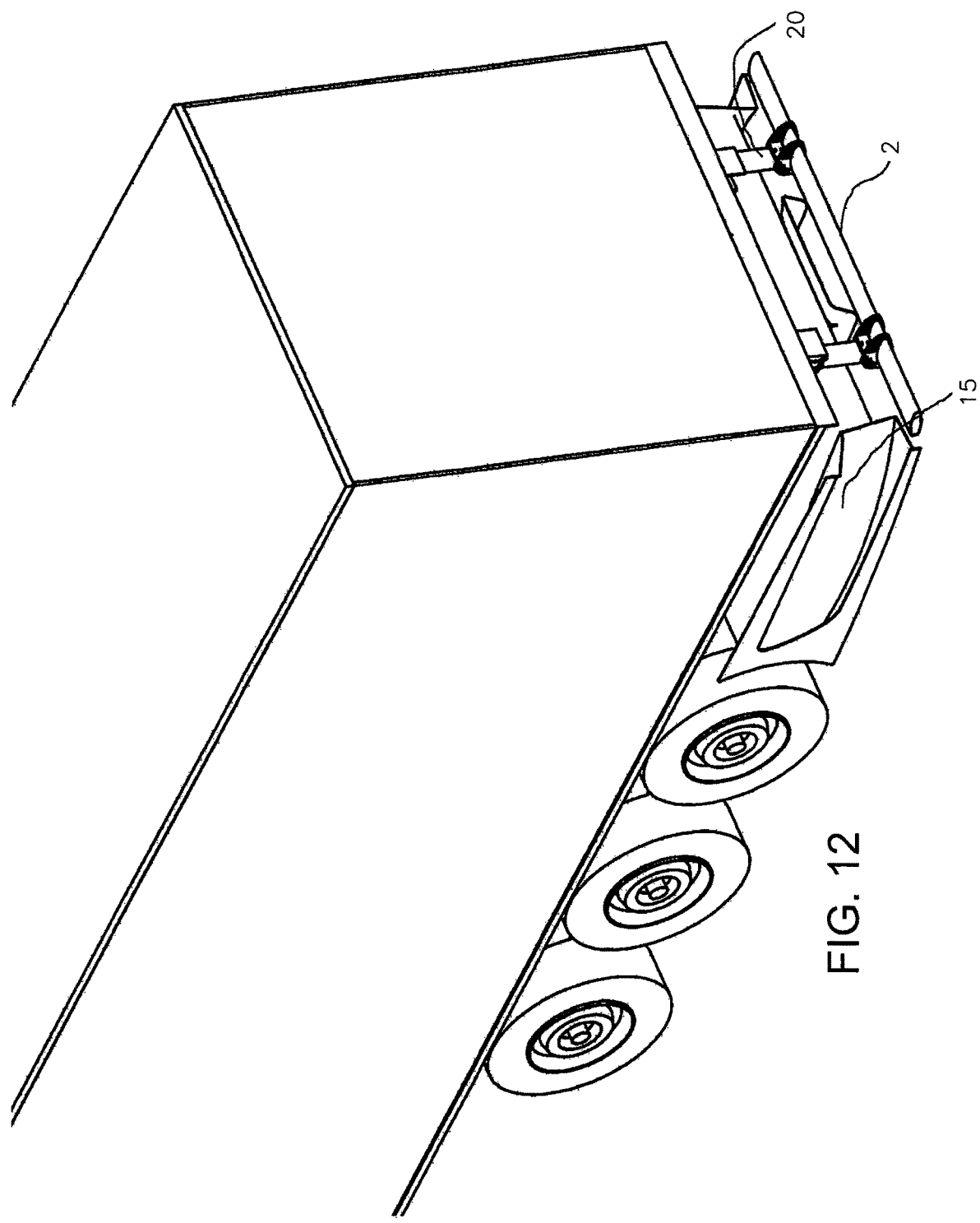
FIG. 12 shows a top perspective view of a further embodiment of the invention.

FIG. 11 shows an additional embodiment. In this embodiment, the element 2 also carries a license-plate or other identification elements of the vehicle 100.

The elements 2,12,22 may be also advantageously formed in the form of a bumper.

Figure 13:
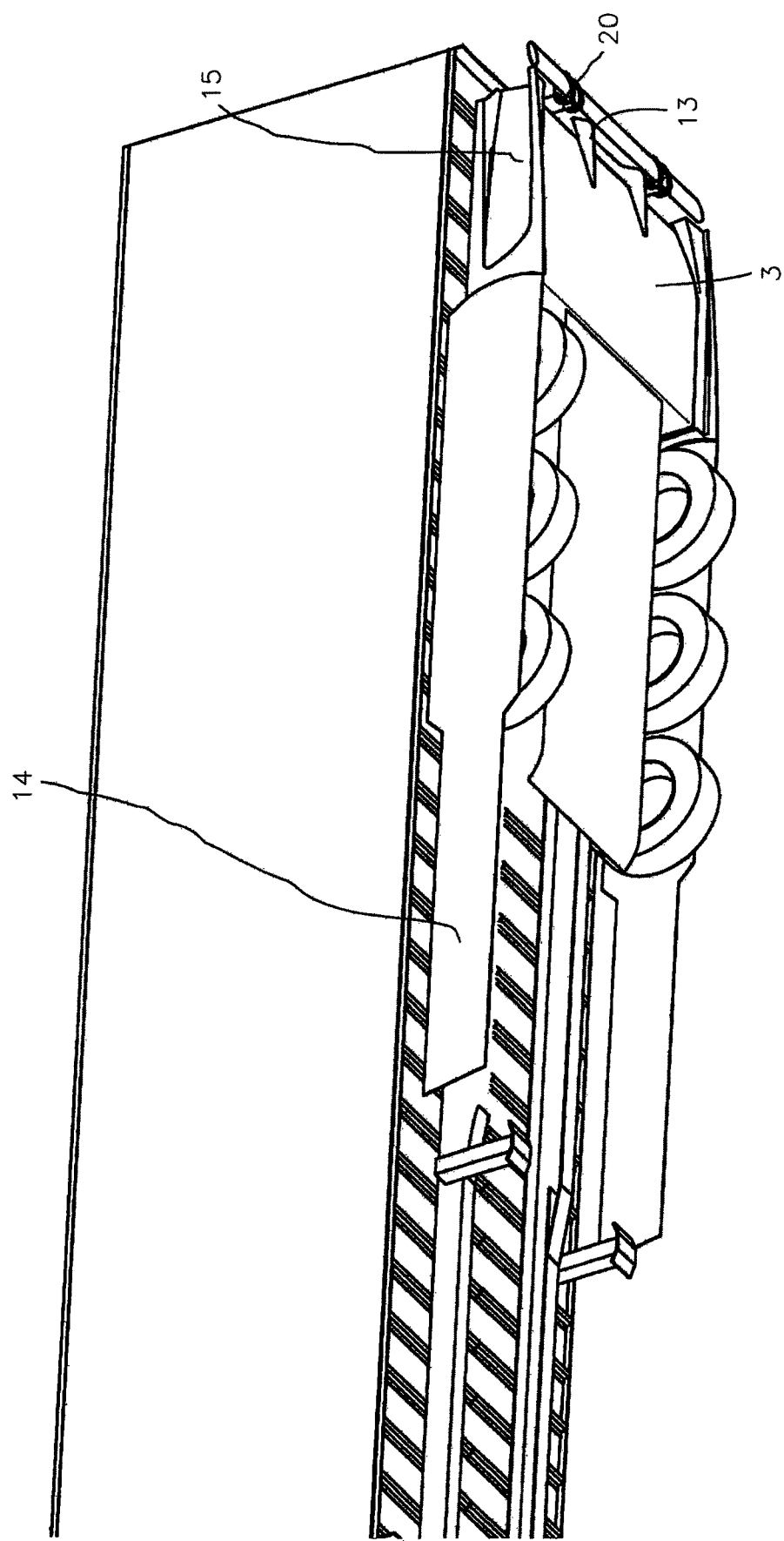
FIG. 13 shows a bottom perspective view of a further embodiment of the invention.
Figure 14:
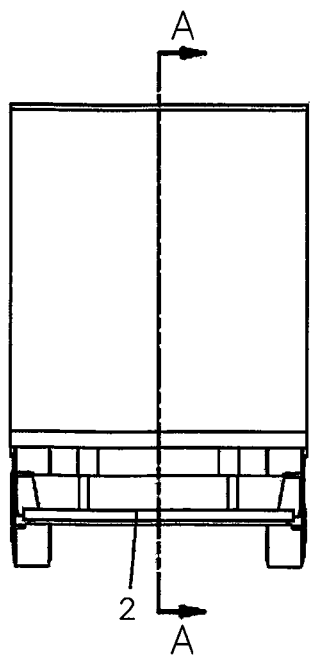
FIG. 14 shows a rear view of a truck with a system according to a further embodiment of the invention fixed thereto.
Figure 15:
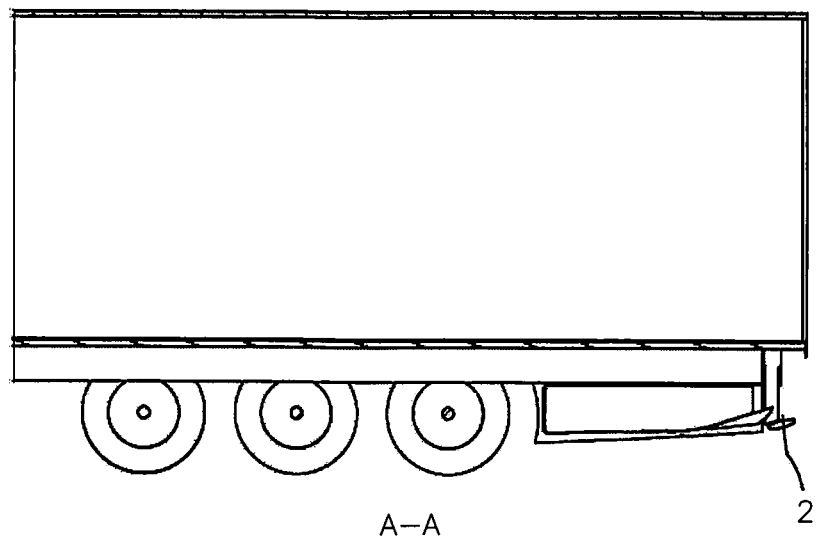
FIG. 15 shows a cross-section of FIG. 14.

FIG. 13 shows a further embodiment of the system of the invention. Air deflecting elements 13 are mounted to the inclined surface 3. These air deflecting elements are arranged vertically parallel to the driving direction. This will improve air flow deflection and accordingly decrease wake vortices.

FIG. 13 further shows lateral elements such as body parts or air deflection elements 14, which exteriorly cover the wheels. These elements reduce turbulence between the air flow 10 underneath the truck 100 and the air flow on the sides of the truck.

Furthermore, laterally inclined air deflecting elements 15 may be also provided at the end of the inclined surface 3, for deflecting the air flow toward the center of the vehicle.

It will be finally appreciated that the system as described heretofore are susceptible of additions, changes or variants that would be obvious to the skilled person, without departing from the scope of the invention as defined by the appended claims.

LIST OF NUMBERS 1 system of the invention
2 element
3 first inclined wall
10 air flow
11 defectors
12 element
13 air deflectors
14 air deflecting element
15 inclined air deflecting element
20 tubular profile
22 element
100 land vehicle, truck, trailer or the like

The invention claimed is:

1. A system for land vehicles which is located on the bottom surface of the vehicle facing the road surface at the rear end portion of the vehicle, comprising at least one longitudinally-inclined wall, tapering toward the back of the vehicle, wherein substantially at the end of the inclined wall, after the last axle of the vehicle, at least one element is interposed between the road surface and the inclined wall and the horizontal axis of the at least one element has substantially the same inclination as the inclined wall.

2. The system as claimed in claim 1, wherein the at least one element has at least two portions with a horizontal axis, that has substantially the same inclination as the inclined wall.

3. The system as claimed in claim 1, wherein a front inclined wall forms the bottom surface of a hollow body.

4. The system as claimed in claim 1, wherein at least one element is designed with a wing shape.

5. The system as claimed in claim 1, wherein side deflectors are arranged for improved air flow.

6. The system as claimed in claim 1, wherein the at least one element forms a bumper.

7. The system as claimed in claim 1, wherein the at least one element is used as a mount for a license-plate.

8. The system as claimed in claim 1, wherein the inclined wall and the horizontal axis of the at least one element form an angle of inclination with the road surface that ranges from 10° to 30°.

9. The system as claimed in claim 1, wherein air deflecting members are attached to the inclined wall, the air deflecting members being arranged vertically parallel to the driving direction.

10. The system as claimed in claim 1, wherein wheels of the land vehicle are at least partially covered by air deflecting members on the wheels outer side.

* * * * *